US012748662B2

(12) United States Patent
Georgakos et al.

(10) Patent No.: US 12,748,662 B2
(45) Date of Patent: Sep. 29, 2026

(54) CIRCUIT ARRANGEMENT AND DEVICE WITH COMBINATORIAL CIRCUIT AND MEMORY CIRCUIT, SYSTEM AND METHOD

(71) Applicant: Infineon Technologies AG, Neubiberg (DE)

(72) Inventors: Georg Georgakos, Fraunberg (DE); Wolfgang Ecker, Munich (DE); Michael Goessel, Mahlow (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 19/028,417

(22) Filed: Jan. 17, 2025

(65) Prior Publication Data

US 2025/0238319 A1 Jul. 24, 2025

(30) Foreign Application Priority Data

Jan. 19, 2024 (DE) ......................... 102024101585.3

(51) Int. Cl.
*G06F 11/08* (2006.01)
*G06F 11/10* (2006.01)

(52) U.S. Cl.
CPC ...... *G06F 11/1068* (2013.01); *G06F 11/1016* (2013.01)

(58) Field of Classification Search
None
See application file for complete search history.

(56) References Cited

U.S. PATENT DOCUMENTS 6,304,614 B1 * 10/2001 Abbaszadeh .......... H03M 13/25 375/279
9,496,986 B2 * 11/2016 Roh .................... H04L 25/0204
11,349,495 B2 * 5/2022 Kumar .............. H03M 13/6337
2018/0205431 A1 * 7/2018 Nammi ................ H04B 7/0478
2018/0323841 A1 * 11/2018 Nammi ................ H04B 7/0456
2019/0306730 A1 * 10/2019 Zhang ................. H04W 56/001
2019/0312601 A1 10/2019 Kern et al.
2020/0162139 A1 * 5/2020 Nammi ................ H04J 11/0036
2021/0006316 A1 * 1/2021 Long ..................... H04B 17/336
2021/0133028 A1 * 5/2021 Kim ..................... G06F 11/1004
2022/0385427 A1 * 12/2022 Frenne .................. H04L 5/0051
2023/0231649 A1 * 7/2023 Ebrahimzad .......... H04L 1/0042 714/776

FOREIGN PATENT DOCUMENTS

DE 60024564 T2 8/2006
DE 102007026406 A1 12/2008
DE 102016105024 A1 9/2017

* cited by examiner

*Primary Examiner* — Mujtaba M Chaudry
(74) *Attorney, Agent, or Firm* — Slater Matsil, LLP

(57) ABSTRACT

In accordance with an embodiment, a circuit arrangement includes a combinatorial circuit having a group of inputs and a group of outputs, where the combinatorial circuit is configured, during error-free operation of the combinatorial circuit, to map a codeword, present at the group of inputs, of a first error code to a codeword of a second error code at the group of outputs, and to map a non-codeword, present at the group of inputs, of the first error code to a non-codeword of the second error code; and a memory circuit configured to store an output of the combinatorial circuit at the group of outputs, and configured to correct at least 1-bit errors occurring during storage.

20 Claims, 8 Drawing Sheets

CIRCUIT ARRANGEMENT AND DEVICE WITH COMBINATORIAL CIRCUIT AND MEMORY CIRCUIT, SYSTEM AND METHOD

This application claims the benefit of German Patent Application No. 102024101585.3,filed on Jan. 19, 2024, which application is hereby incorporated herein by reference.

TECHNICAL FIELD

The present application relates to circuit arrangements, devices, systems and methods in which provision is made for a combinatorial circuit and a memory circuit.

BACKGROUND

Circuit arrangements may contain combinatorial circuits that process data and memory circuits that store data. Errors may occur both when processing data and when storing them.

Depending on the application, there may be a requirement here to detect and/or correct errors. A simple correction is also possible by repeating the respective process in the event of a detected error until no further error occurs. This however costs processing time and thus makes the respective function less readily available.

Conventional error correction methods are also comparatively expensive in terms of footprint on the chip.

SUMMARY

According to one embodiment, provision is made for a circuit arrangement that comprises a combinatorial circuit and a memory circuit. The combinatorial circuit has a group of inputs and a group of outputs, wherein the combinatorial circuit is configured, in the event of error-free operation of the combinatorial circuit, to map a codeword, present at the group of inputs, of a first error code to a codeword of a second error code at the group of outputs, and to map a non-codeword, present at the group of inputs, of the first error code to a non-codeword of the second error code. The memory circuit is configured to store an output of the combinatorial circuit at the group of outputs. The memory circuit is furthermore configured to correct at least 1-bit errors at storage or during storage. The terms “at storage” and “during storage” are used synonymously here in the context of the present application.

According to a further embodiment, provision is made for a device that has a combinatorial circuit and an arrangement of memory cells. The combinatorial circuit is configured to receive a first bit signal containing first data bits and at least one first check bit, and to output a second bit signal containing second data bits and at least one second check bit. The combinatorial circuit is configured, in the event of error-free operation, if the first data bits and the at least one first check bit are a codeword of a first error code, to determine the at least one second check bit such that the second data bits and the at least one second check bit are a codeword of a second error code. If, on the other hand, the first data bits and the at least one first check bit are not a codeword of the first error code, the combinatorial circuit is configured to determine the at least one second check bit such that the second data bits and the at least one second check bit are not a codeword of the second error code.

The arrangement of memory cells is configured to store the second bit signal such that at least one bit error is corrected during storage.

According to a further embodiment, provision is made for a method comprising processing a first bit signal containing first data bits and at least one first check bit, in order to generate a second bit signal containing second data bits and at least one second check bit. In the event of error-free processing, if the first data bits and the at least one first check bit are a codeword of a first error code, the at least one second check bit is determined here such that the second data bits and the at least one second check bit are a codeword of a second error code and, if the first data bits and the at least one first check bit are not a codeword of the first error code, the at least one second check bit is determined such that the second data bits and the at least one second check bit are not a codeword of the second error code. The method additionally comprises storing the second bit signal, wherein at least 1-bit errors are corrected during storage. The processing may be carried out in particular by a combinatorial circuit, and the storage may be carried out in particular by a memory circuit.

The above summary gives only a brief overview of some embodiments and should not be interpreted as limiting, since other embodiments may have features other than those described above.

BRIEF DESCRIPTION THE DRAWINGS

DETAILED DESCRIPTION OF ILLUSTRATIVE EMBODIMENTS

Figure 1:
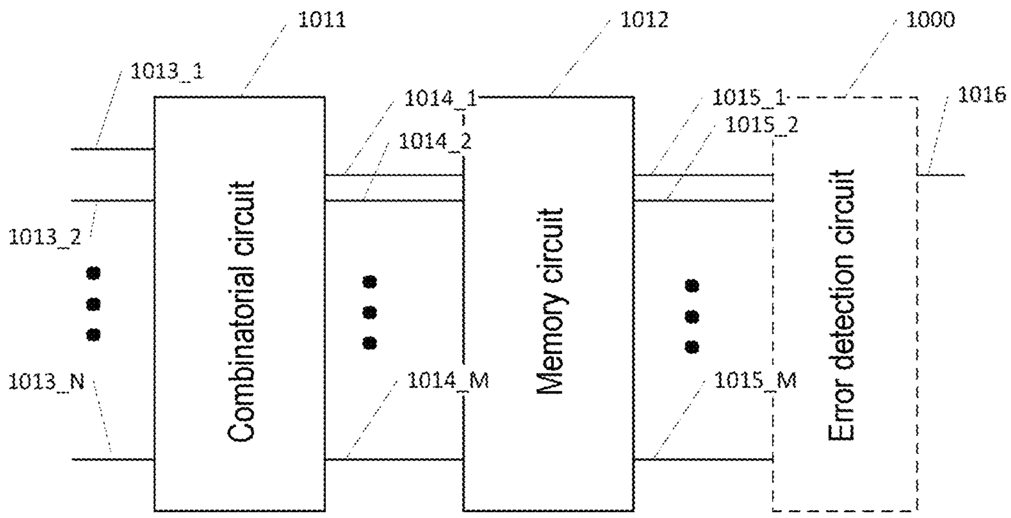
FIG. 1 is a block diagram of a device according to one embodiment.

Various embodiments are explained in detail below. These embodiments should not be interpreted as limiting. Features of various embodiments may be combined with one another. Variations, modifications and details that are described for one of the embodiments may also be applied to other embodiments, unless indicated otherwise, and are therefore not described repeatedly. Before embodiments are now explained in detail, an explanation will be given of various terms that are used hereinafter.

An error code is the name given to a code that may be used to detect, correct, or detect and correct errors in a data word, which is then referred to as an error-detecting, error-correcting, or error-detecting and error-correcting code. For this purpose, in some error codes, a number of check bits (one or more check bits) are added to a number of data bits. Hereinafter, for the sake of simplicity, the term “check bits” is used in the plural form, wherein it should be understood that a single check bit may also be involved.

The check bits are usually determined from the data bits in accordance with a specific rule. A receiver of the data bits and of the check bits is then able to understand this rule, and if the received check bits are obtained from the data bits in accordance with the rule, it may for example be detected that no error is present, whereas, if the received check bits are not obtained from the received data bits in accordance with the rule, an error is present.

Other examples of error codes other than parity codes are Hamming codes, Hsiao codes, BCH codes, m-out-of-n codes, Berger codes and the like.

Generally speaking, the error code may be described as a subset of a predefined set. Elements of the subset are elements of the code, for example elements for which the abovementioned rule is satisfied. Such elements of the code are referred to as codewords in the present application. Elements of the predefined set that are not elements of the subset are not elements of the code and are referred to as non-codewords in the context of the present application. If each element of the code is denoted by N components, for example N bits, then N is the name given to the length of the code, and the code in question is a block code of length N. As mentioned above, an element of the code consisting of N components is also referred to as a codeword, in this case codeword of length N.

One simple example is the parity code, wherein use is made here, as an example, of a code having three data bits $x_1$, $x_2$, $x_3$ and a parity bit P, wherein P is obtained as an exclusive OR logic combination (abbreviated to "$\oplus$" here) of the data bits, that is to say $P=x_1 \oplus x_2 \oplus x_3$. The length of the code is 4 here, and the parity code is a block code of length 4. The parity bit here is an example of a check bit that is able to be determined from the values of the data bits in accordance with the rule, here the exclusive OR logic combination. In this case, the predefined given set Y of all 16 4-bit words is $x_1$, $x_2$, $x_3$, P with $x_1, x_2, x_3, P \in \{0,1\}$ Y={0000, 0001, 0010, 0011, 0100, 0101, 0110, 0111, 1001, 1010, 1011, 1100, 1101, 1110, 1111}.

The set $Y_P$ of 4-bit words that are codewords of this parity code is $Y_P$={0000, 0011, 0101, 0110, 1001, 1010, 1100, 1111}. This set $Y_P$ gives rise to the parity bit (the last bit in each case) through an exclusive OR logic combination of the first three bits. The set $Y_P$ is the abovementioned subset of the predefined set Y. The remaining 4-bit words of the set Y that are not contained in $Y_P$ are then non-codewords. If a codeword, that is to say an element of the subset that describes the code, is changed by a bit error to a word that is a non-codeword, the error is able to be detected. If, in the above example, the codeword 0000 is changed by an error to the word 0100, then the error is able to be detected because 0100 is not a word of the subset $Y_P$ and is not a codeword. If a codeword is changed to another codeword by an error, then the error is not able to be detected. If for example the codeword 0000 is changed to the codeword 0101 by an error (that is to say two bits are changed erroneously), then the error is not able to be detected since 1010 is likewise a codeword.

Thus, only 1-bit errors are able to be detected reliably by the above parity code, whereas 2-bit errors, that is to say the changing of two bits, may still lead to a codeword.

However, the above code is just one example. For instance, multi-bit errors are also able to be detected using codes that contain more than two check bits. The parity code is also just one example, and other codes may be used.

In addition, it should be noted that, in the exemplary embodiments described below, cases are also possible in which further data bits, which may assume arbitrary values, are present in addition to the data bits from which the check bits are formed. In the above example, any two bits $y_2$, $y_3$ are then appended to the word $x_1$, $x_2$, $x_3$, P (or prepended thereto or inserted elsewhere). This may be considered such that the overall word $x_1$, $x_2$, $x_3$, P, $y_2$, $y_3$, regardless of the value of the bits $y_2$, $y_3$, is a codeword if P is obtained as parity from $x_1$, $x_2$, $x_3$ and, regardless of the values $y_2$, $y_3$, is a non-codeword if P is not obtained as parity of the bits $x_1$, $x_2$, $x_3$. As an alternative, this may be considered such that the error code refers only to the bits $x_1$, $x_2$, $x_3$, P, and $y_2$, $y_3$ do not belong to the error code. Both approaches are equivalent, and in any case errors in the bits $y_2$, $y_3$ are not able to be detected, since these are not incorporated into the determination of the parity bit P. Such a situation may occur for example if a circuit is supplied at input both with the bits $x_1$, $x_2$, $x_3$, P from a first source and with $y_2$, $y_3$ from a second source, such that the "overall input" consists of the bits $x_1$, $x_2$, $x_3$, P, $y_2$, $y_3$. In this case too, the number of 2 bits $y_2$, $y_3$ should be understood only as an example.

Similarly, the case may occur where input data for a circuit, for example from two different sources, contains two different error codes. By way of example, a circuit may thus be supplied with the bits $x_1$, $x_2$, $x_3$, P, $y_2$, $y_3$, P2, wherein the bits $x_1$, $x_2$, $x_3$, P are as described above and the bit $P_2$ is obtained as parity bit for the bits y2, y3. Different encodings may also be present here. Such error codes, which refer to different parts of an input signal or output signal, are also referred to as partial error codes in the context of the present application.

In the latter case, the parity bit P and the parity bit P2 may then be combined into a single parity bit $P3=P \oplus P2$ for further processing. In other embodiments, the parity bits may be left unchanged.

A combinatorial circuit is understood, in the context of this application, to mean a circuit that processes an input signal to form an output signal. By way of example, data bits of an input signal (such as the above data bits $x_1$, $x_2$, $x_3$, $y_2$, $y_3$) may be processed by various operations, such as logic combinations, calculations, or any other operations that process the data and are required for a particular application. The processing of the input signal onto the output signal is also referred to, in the context of the present application, as mapping the input signal to the output signal. Both the input signal and the output signal may be protected by an error code, wherein the above variation options apply both to the output signal and to the input signal, that is to say bits that are not detected by the error code may be present and/or partial error codes may be present. A combinatorial circuit is referred to as being code-preserving if, in the event of error-free operation, it maps a codeword at its input to a codeword at its output, and maps a non-codeword at its input to a non-codeword at its output. The error codes that are used at the input and output may be different or the same here. By way of example, both error codes may be a bit parity code, but also differ in terms of the type of code or the number of check bits used.

As an example, it is assumed that such a code-preserving combinatorial circuit receives the above bits $x_1$, $x_2$, $x_3$, P as input and outputs bits $z_1$, $z_2$, $z_3$, $z_4$, P4, wherein P4 is a parity bit for the bits $z_1$ to $z_4$. The example of four output data bits $z_1$ to $z_4$ is again only one example here, and the output number of output data bits may be less than, greater than or equal to the number of input data bits, depending on the function of the combinatorial circuit.

If the combinatorial circuit then operates without errors and $x_1$, $x_2$, $x_3$, P is a codeword, then $z_1$, $z_2$, $z_3$, $z_4$, P4 is also a codeword. If $x_1$, $x_2$, $x_3$, P is not a codeword, then $z_1$, $z_2$, $z_3$, $z_4$, P4 is also not a codeword.

This also means that if either the input data or the output data are a codeword and the respective other data (output data or input data) are not a codeword, an error is present in the combinatorial circuit.

A combinatorial circuit is distinguished from a memory circuit in the context of the present application. A memory circuit is used to store or buffer-store data for longer or shorter periods. Although combinatorial circuits, for example in order to compensate for propagation time differences or the like, may likewise buffer-store individual data (for example for delay purposes in order to combine data from different processing branches at the right time), they are not used in principle to store data. Memory circuits may use traditional memory elements such as flip-flops, for example.

In various exemplary embodiments, such memory circuits are configured to correct at least 1-bit errors, that is to say if one bit is stored erroneously, the correct data are still able to be read out. In other exemplary embodiments, it is also possible to correct multi-bit errors, for example 2-bit errors or 3-bit errors, in which more than one bit is stored incorrectly or changed during storage. One simple error correction option is to store each bit or each data word in triplicate and to make a majority decision at readout. If only one of the stored values is stored incorrectly or changed during storage, the correct value is still able to be read out by virtue of the majority decision. Specific, non-limiting examples of combinatorial circuits and memory circuits as described above will be explained later.

FIG. 1 shows a device according to one embodiment, in the form of a circuit arrangement of multiple circuits.

The device of FIG. 1 has a combinatorial circuit 1011, a memory circuit 1012 and optionally an error detection circuit 1000. The combinatorial circuit 1011 has N inputs 1013_1 to 1013_N and M outputs 1014_1 to 1014_M, wherein, in the illustrated example, one bit is transferred on each input. Rather than parallel transmission of multiple bits, serial transmission is also possible. This is likewise considered as a corresponding number of inputs in the context of the present application.

At least one subset of data bits at the inputs 1013_1 to 1013_N is protected by a first error code, and at least one subset of data bits at the outputs 1014_1 to 1014_M is protected by a second error code. In the case of a code containing check bits, n data bits and at least one check bit are supplied to the combinatorial circuit 1011, wherein the at least one check bit is obtained from the n data bits, wherein n plus the number of first check bits is less than or equal to N. m data bits and at least one second check bit are output at the outputs 1014_1 to 1014_M, wherein m plus the number of second check bits is less than or equal to M. For illustration purposes, codes containing data bits and check bits are used below. However, other codes are also possible in which a total number of bits greater than a number of data bits to be transmitted is obtained for example from the data bits using a calculation rule.

The outputs of the combinatorial circuit 1011 are connected to a memory circuit 1012, which is configured to store the bits that are output (data bits and check bits) and to output them at corresponding outputs 1015_1 to 1015_M at a later time. By way of example, the memory circuit 1012 may be based on flip-flops or other memory elements. The memory circuit 1012 is configured to correct at least 1-bit errors. This means that if a bit is changed by an error during storage or while the data are being stored, the correct data will still be read out as stored. Such a correction may be implemented for example through redundant storage and a majority decision. Examples of such implementation options will be explained in more detail later. In many applications, 1-bit errors may occur comparatively frequently during storage, but multi-bit errors occur rarely. In such a case, in the event of a 1-bit correction, it may be assumed that the read-out data at 1015_1 to 1015_M are correct. This allows for example an optional error detection circuit 1000 to detect errors at the input or output of the combinatorial circuit by reading out the memory circuit. If the read-out data correspond to a codeword, assuming that the read-out data are correct due to the error correction of the memory circuit, it may be assumed that the data output by the combinatorial circuit are also a codeword and are thus correct. If, on the other hand, the data read out from the memory circuit are a non-codeword, it may be assumed, under the same assumption, that the data output from the combinatorial circuit 1011 are also a non-codeword. This then also means that either the input data of the combinatorial circuit at the inputs 1013_1 to 1013_N are already a non-codeword (because of the code-preserving property of the combinatorial circuit 1011), or that an error has occurred in the combinatorial circuit 1011 that has distorted a codeword at the input of the combinatorial circuit so as to form a non-codeword. It is thus possible to detect an error in the combinatorial circuit 1011 by way of an error detection circuit 1000 connected downstream of the memory circuit 1012. It is therefore not necessary, in such exemplary embodiments, to arrange an error detection circuit, such as the error detection circuit 1000, directly at the output of the combinatorial circuit loll. A similar statement applies to a longer chain of combinatorial circuits and memory circuits. If it is now further assumed that errors in the combinatorial circuit 1011 itself occur very rarely, then erroneous data, that is to say non-codewords, are able to be detected in combinatorial circuits. The error detection circuit 1000 may then output an error signal at an output 1016.

The concept explained above is based on the observation that errors in combinatorial circuits generally occur comparatively rarely, whereas errors in memory circuits occur comparatively more frequently. Therefore, provision is made for error correction in the memory circuit, whereas otherwise errors are detected only based on the error codes that are used. It should be noted that, notwithstanding this, combinatorial circuits with error correction may also be used in other exemplary embodiments. Such a combinatorial circuit with error correction may be implemented for example by carrying out computations redundantly, for example in triplicate, and then making a majority decision.

Figure 2:
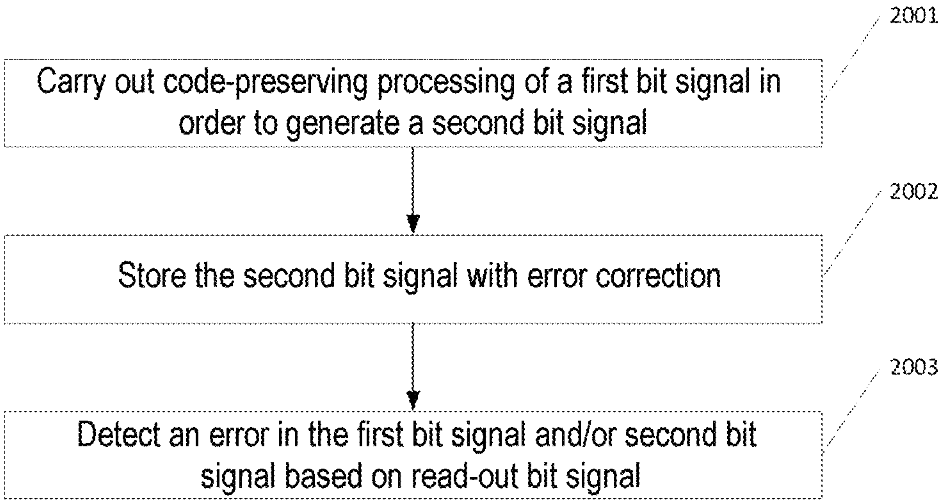
FIG. 2 is a flowchart of a method according to one embodiment.

FIG. 2 shows a flowchart for illustrating a method according to one exemplary embodiment. The method of FIG. 2 may be implemented for example in the circuit arrangement of FIG. 1 or one of the circuit arrangements described below, but is not limited thereto. However, in order to avoid repetitions, reference is made to the above explanations of FIG. 1 in the description of the method of FIG. 2.

In 2001, the method comprises carrying out code-preserving processing of a first bit signal in order to generate a second bit signal. This may be done, as explained with reference to FIG. 1, with a code-preserving combinatorial circuit such as the combinatorial circuit 1011, wherein the first bit signal is then supplied at the inputs 1013_1 to 1013_N and the second bit signal is output at the outputs 1014_1 to 1014_M.

In 2002, the method comprises storing the second bit signal with error correction of at least 1-bit errors, as described by way of example with reference to the memory circuit 1012 of FIG. 1. In 2003, the method of FIG. 2 optionally comprises detecting an error in the first bit signal and/or second bit signal based on a bit signal read out from the memory device in which the second bit signal was stored in 2002, as described by way of example for the error detection circuit 1000 of FIG. 1.

Figure 3:
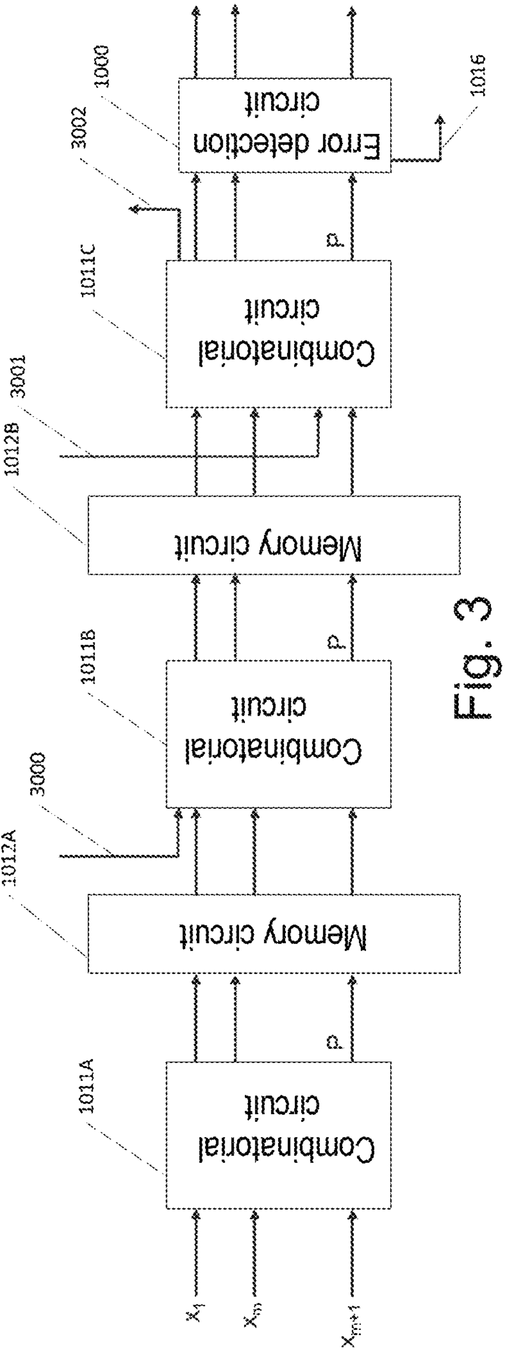
FIG. 3 is a block diagram of a device according to one embodiment.

FIG. 3 shows a circuit arrangement according to a further exemplary embodiment.

The circuit arrangement of FIG. 3 contains a combinatorial circuit 1011A, a memory circuit 1012A connected downstream of the combinatorial circuit 1011A, a combinatorial circuit 1011B connected downstream of the memory circuit 1012A, a memory circuit 1012B connected downstream of the combinatorial circuit 1011B, a combinatorial circuit 1011C connected downstream of the memory circuit 1012B, and an error detection circuit 1000 connected downstream of the combinatorial circuit 1011C. The arrangement here should be understood only as an example. Thus, instead of an alternating arrangement of combinatorial circuits and memory circuits as illustrated, two or more combinatorial circuits and/or two or more memory circuits may also be connected directly in series. The number of combinatorial circuits and memory circuits should also be understood only as an example, and provision may also be made for more or fewer combinatorial circuits or memory circuits than illustrated.

The combinatorial circuits 1011A, 1011B, 1011C basically work in a code-preserving manner as described for the combinatorial circuit 1011 of FIG. 1, and use corresponding error codes, in the example of FIG. 3 a parity code with a parity bit P. The memory circuits 1012A, 1012B are configured to correct at least 1-bit errors, as described for the memory circuit 1012 of FIG. 1. For the combinatorial circuits, FIG. 3 in this case shows various variants.

The combinatorial circuit 1011A works as described for the combinatorial circuit 1011 of FIG. 1, that is to say it receives input bits comprising data bits and check bits, in this case input bits $x_1$ to $x_m$ and a parity bit $x_{m+1}$. The combinatorial circuit 1011A then outputs corresponding data bits with a parity bit as check bit, wherein the number of data bits may remain the same or may change.

The bit signal output by the combinatorial circuit 1011A is then stored in the memory circuit 1012A and read out by the combinatorial circuit 1011B.

In addition to the output of the memory circuit 1012A, the combinatorial circuit 1011B receives one or more further input bits at an input 3000. These one or more further input bits are not protected, and so they do not contain an error code. The combinatorial circuit 1011B then outputs a bit signal, which again is protected by a parity bit P.

In this case, code-preserving, as already explained at the outset, means that the one or more bits that are supplied at the input 3000 do not play any role. This may be seen in that the error code at the input of the combinatorial circuit 1011B refers only to the bits read out from the memory circuit 1012A, or in that the one or more bits supplied at the input 3000 do not play any role for the error code at the input of the combinatorial circuit 1011B, that is to say the determination as to whether a codeword or non-codeword is present at the input does not depend on the value of the one or more bits at the input 3000, but only on the remaining bits. It is thereby possible to incorporate signals from an unprotected domain, which does not use error codes, into the processing of the circuit arrangement of FIG. 3.

The output of the combinatorial circuit 1011B is stored in the memory circuit 1012B.

The combinatorial circuit 1011C reads the stored bit signal from the memory circuit 1012B and additionally receives one or more bits at an input 3001. In contrast to the combinatorial circuit 1011B with the input 3000, the one or more bits that the combinatorial circuit 1011C receives are protected, that is to say they contain an error code, for example likewise a parity code containing data bits and a parity bit. In this case, the code-preserving function means that the input data of the combinatorial circuit 1011C correspond to a codeword if both the bit signal read from the memory circuit 1012B corresponds to a codeword (that is to say, in the example of the parity code, the parity bit is the exclusive OR logic combination of the data bits) and the one or more bits supplied at the input 3001 are a codeword of the error code used there, for example likewise the corresponding parity bit is an exclusive OR logic combination of the data bits.

In this sense, the error codes of the bit signal read from the memory circuit 1012B and the error codes of the one or more bits at the input 3001 may be regarded as partial error codes of the signal supplied to the combinatorial circuit 1011C, that is to say an overall codeword is present only if a codeword is present for both error codes, which codeword is mapped to a codeword with the parity bit P at the output of the combinatorial circuit 1011C in the event of error-free operation. If no codeword is present in one of the two error codes, no or both error codes, a non-codeword will also be output at the output in the event of error-free operation of the combinatorial circuit 1011C, in accordance with the discussed code-preserving function.

In addition, the combinatorial circuit 1011C also has an output 3002 at which further data are output (that is to say one or more bits), which further data, in some exemplary embodiments, may be protected by an error code and, in other exemplary embodiments, may be unprotected. In any case, the data output at the output 3002 do not influence the error code otherwise output by the combinatorial circuit 1011C. The circuit arrangement of FIG. 3 may thus also output protected or unprotected data to other circuits.

The error detection circuit 1000 may check whether the bit signal output by the combinatorial circuit 1011C is a codeword. If this is not the case, an error signal may be output in 1016, as already discussed with reference to FIG. 1. This then indicates an error either in the input signal of the combinatorial circuit 1011A or an error in the processing in the combinatorial circuits 1011A to 1011C, since errors in the memory circuits 1012A, 1012B are corrected, at least the probable 1-bit errors. If the error is intended to be located more precisely, provision may however also be made for more error detection circuits, for example connected downstream of the memory circuit 1012A, connected downstream of the memory circuit 1012B or connected downstream of one of the combinatorial circuits 1011A, 1011B, such as directly.

However, it is not necessary to provide an error detection circuit downstream of each block. This is achieved, in the illustrated exemplary embodiment, by the combination of code-preserving combinatorial circuits with error-correcting memory circuits. Thus, in the exemplary embodiment of FIG. 2, an error at the inputs of the memory circuit 1012A, 1012B is not corrected, since the memory circuit 1012A or 1012B does not distinguish between data bits and check bits and stores each input bit independently, regardless of whether it is a data bit or check bit. Only if an error occurs in the memory circuit 1012A or 1012B itself during storage, this error is corrected in the memory circuit and thus does not influence the error code. An arrangement of a combinatorial circuit 1011A and downstream memory circuit 1012A is thus also code-preserving. This means that the error code is not changed by the memory circuit itself. This also applies to any of the above-described arrangements of code-preserving combinatorial circuits and error-correcting memory circuits. Errors in a combinatorial circuit of a circuit arrangement as described above are thus preserved within the circuit arrangement and may therefore be detected at any point using an error detection circuit.

Exemplary implementations of various components of the circuit arrangements discussed above will be explained in more detail below. Implementation options for code-preserving combinatorial circuits are first discussed.

As an example, an explanation is first given of a combinatorial circuit, which is supplied with three input bits $x_1$, $x_2$ und $x_3$ with a parity bit $P_x$ and that outputs output data bits $y_1$, $y_2$, $y_3$ and a parity bit $P_{x,y}$.

In an error-free case, $x_1$, $x_2$, $x_3$, $P_x$ with $P_x = x_1 \oplus x_2 \oplus x_3$ form a codeword of the first error code. If $P_x \neq x_1 \oplus x_2 \oplus x_3$ applies, then no codeword is present, that is to say a non-codeword is present at the input of the combinatorial circuit.

Figure 4A:
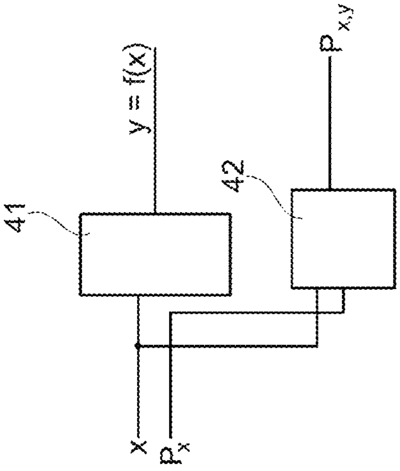
FIGS. 4A to 4C show exemplary implementations of code-preserving combinatorial circuits.

The combinatorial circuit of FIG. 4A is designed such that, when it operates in an error-free manner, it outputs a codeword of the second error code when a codeword of the first error code is input, and outputs a non-codeword of the second error code when a non-codeword of the first error code is input. In this exemplary embodiment, $y_1$, $y_2$, $y_3$, $P_{x,y}$ with $P_{x,y} = y_1 \oplus y_2 \oplus y_3$ form a codeword of the second error code.

If a non-codeword is present at the input of the combinatorial circuit for which $P_x \neq x_1 \oplus x_2 \oplus x_3$ applies, then the partial circuit outputs a non-codeword of the second error code for which $P_{x,y} \neq y_1 \oplus y_2 \oplus y_3$ applies.

The combinatorial circuit under consideration in this exemplary embodiment may be described by a value table, as illustrated in Table 1 below.

The first, third, fifth, seventh, ninth, eleventh, thirteenth and fifteenth rows of Table 1 illustrate the 8 possible input codewords $x_1$, $x_2$, $x_3$, $P_x$ with $P_x = x_1 \oplus x_2 \oplus x_3$ of the first error code and the output codewords $y_1$, $y_2$, $y_3$, $P_y$, x with $P_{x,y} \neq y_1 \oplus y_2 \oplus y_3$ output by the combinatorial circuit.

Rows two, four, six, eight, ten, twelve, fourteen and sixteen illustrate the 8 possible non-codewords $x_1$, $x_2$, $x_3$, $P_x$ with $x_1$, $x_2$, $x_3$, $P_x$ with $P_{x,y} \neq y_1 \oplus y_2 \oplus y_3$ of the first error code and the non-codewords output by the combinatorial circuit, all of which are equal to 0001 here.

TABLE 1

| | $x_1$ | $x_2$ | $x_3$ | $P_x$ | $y_1$ | $y_2$ | $y_3$ | $P_{x,y}$ | |
|---|---|---|---|---|---|---|---|---|---|
| $C_i$ | 0 | 0 | 0 | 0 | 1 | 0 | 0 | 1 | $C_{out}$ |
| | 0 | 0 | 0 | 1 | 0 | 0 | 0 | 1 | |
| $C_i$ | 0 | 0 | 1 | 1 | 1 | 1 | 0 | 0 | $C_{out}$ |
| | 0 | 0 | 1 | 0 | 0 | 0 | 0 | 1 | |
| $C_i$ | 0 | 1 | 0 | 1 | 1 | 1 | 0 | 0 | $C_{out}$ |
| | 0 | 1 | 0 | 0 | 0 | 0 | 0 | 1 | |
| $C_i$ | 0 | 1 | 1 | 0 | 0 | 0 | 0 | 0 | $C_{out}$ |
| | 0 | 1 | 1 | 1 | 0 | 0 | 0 | 1 | |
| $C_i$ | 1 | 0 | 0 | 1 | 0 | 1 | 1 | 0 | $C_{out}$ |
| | 1 | 0 | 0 | 0 | 0 | 0 | 0 | 1 | |
| $C_i$ | 1 | 0 | 1 | 0 | 1 | 1 | 1 | 1 | $C_{out}$ |
| | 1 | 0 | 1 | 1 | 0 | 0 | 0 | 1 | |
| $C_i$ | 1 | 1 | 0 | 0 | 0 | 1 | 1 | 0 | $C_{out}$ |
| | 1 | 1 | 0 | 1 | 0 | 0 | 0 | 1 | |
| $C_i$ | 1 | 1 | 1 | 1 | 1 | 1 | 1 | 1 | $C_{out}$ |
| | 1 | 1 | 1 | 0 | 0 | 0 | 0 | 1 | |

Table 1 illustrates the case in which no internal error has occurred in the partial circuit under consideration.

By way of example, in the third row, the output codeword 1100 is assigned to the input codeword 0011 and, in the fourth row, the output non-codeword 0001 is assigned to the non-codeword 0010. Table 1 describes one exemplary embodiment in which each of the 8 input non-codewords is assigned the same output non-codeword 0001 by the combinatorial circuit if the combinatorial circuit does not have an internal error.

Input codewords are marked in the first column of Table 1 by $C_i$ and output codewords are marked in the tenth column of Table 1 by $C_{out}$. Input non-codewords and output non-codewords are not marked specifically in Table 1.

An internal error, for example a gate error, or an error at the circuit outputs, in the combinatorial circuit may be detected in this exemplary embodiment if an odd number of outputs is distorted by the internal error.

We will consider here, by way of example, that the input codeword 0110 is input. If one of the output non-codewords 0001, 0010, 0100, 1000, 1101, 1011, 1101, 1110 is output due to an internal error, then the error is able to be detected.

If 0010, 0100, 1000, 1101, 1011, 1101, 1110 is output, then it may be detected that an internal error in the circuit is present and no input non-codeword is present at the input of the combinatorial circuit arrangement.

The combinatorial circuit under consideration has been described here by the value table in Table 1. A person skilled in the art will have no problem in determining therefrom an implementation with gates, for example using a synthesis tool.

One example of a second combinatorial circuit is described in Table 2.

TABLE 2

| | $x_1$ | $x_2$ | $x_3$ | $P_x$ | $y_1$ | $y_2$ | $y_3$ | $P_{x,y}$ | |
|---|---|---|---|---|---|---|---|---|---|
| $C_i$ | 0 | 0 | 0 | 0 | 1 | 0 | 0 | 1 | $C_{out}$ |
| | 0 | 0 | 0 | 1 | 1 | 0 | 0 | 0 | |
| $C_i$ | 0 | 0 | 1 | 1 | 1 | 1 | 0 | 0 | $C_{out}$ |
| | 0 | 0 | 1 | 0 | 1 | 1 | 0 | 1 | |
| $C_i$ | 0 | 1 | 0 | 1 | 1 | 1 | 0 | 0 | $C_{out}$ |
| | 0 | 1 | 0 | 0 | 1 | 1 | 0 | 1 | |
| $C_i$ | 0 | 1 | 1 | 0 | 0 | 0 | 0 | 0 | $C_{out}$ |
| | 0 | 1 | 1 | 1 | 0 | 0 | 0 | 1 | |
| $C_i$ | 1 | 0 | 0 | 1 | 0 | 1 | 1 | 0 | $C_{out}$ |
| | 1 | 0 | 0 | 0 | 0 | 1 | 1 | 1 | |
| $C_i$ | 1 | 0 | 1 | 0 | 1 | 1 | 1 | 1 | $C_{out}$ |
| | 1 | 0 | 1 | 1 | 1 | 1 | 1 | 0 | |
| $C_i$ | 1 | 1 | 0 | 0 | 0 | 1 | 1 | 0 | $C_{out}$ |
| | 1 | 1 | 0 | 1 | 0 | 1 | 1 | 1 | |
| $C_i$ | 1 | 1 | 1 | 1 | 1 | 1 | 1 | 1 | $C_{out}$ |
| | 1 | 1 | 1 | 0 | 1 | 1 | 1 | 0 | |

In Table 2, the same output codewords as in Table 1 are assigned to the input codewords. For instance, the output codeword 1100 is assigned to the input codeword 0101 in row 5, as in Table 1.

The output non-codeword 1101 is assigned to the input non-codeword 0100 in the sixth row, which differs, in terms of its parity bit $P_x = 0$, from the parity bit $P_x = 1$ of the input codeword 0101 in the fifth row, which output non-codeword differs from the corresponding bits of the output codeword in the fifth row not in terms of the bits $y_1$, $y_2$, $y_3 = 110$, but in terms of its parity bit $P_{x,y}$.

The combinatorial circuit may be implemented in accordance with the value table in Table 2 such that the following applies.

1. A first combinatorial circuit is implemented, which implements the dependence of the output bits $y_1$, $y_2$, $y_3$ on the input bits $x_1$, $x_2$, $x_3$ in accordance with Table 3. The dependence of $y_1$, $y_2$, $y_3$ on $x_1$, $x_2$, $x_3$ may be described by a function $y_1, y_2, y_3 = f(x_1, x_2, x_3)$, whose value table is illustrated in Table 3.

TABLE 3

| $y_1, y_2, y_3 = f(x_1, x_2, x_3)$ | | | | | |
|---|---|---|---|---|---|
| $x_1$ | $x_2$ | $x_3$ | $y_1$ | $y_2$ | $y_3$ |
| 0 | 0 | 0 | 1 | 0 | 0 |
| 0 | 0 | 1 | 1 | 1 | 0 |
| 0 | 1 | 0 | 1 | 1 | 0 |
| 0 | 1 | 1 | 0 | 0 | 0 |
| 1 | 0 | 0 | 0 | 1 | 1 |
| 1 | 0 | 1 | 1 | 1 | 1 |
| 1 | 1 | 0 | 0 | 1 | 1 |
| 1 | 1 | 1 | 1 | 1 | 1 |

2. A second partial circuit is implemented, which generates the bit $P_{x,y}$ on the basis of $x_1$, $x_2$, $x_3$, $P_x$, as illustrated in Table 4. The dependence of $P_{x,y}$ on $x_1$, $x_2$, $x_3$, $P_x$ may be described by a function $P_{x,y}=P(x_1, x_2, x_3, P_x)$, as illustrated in Table 4.

TABLE 4

| $P_{x,y} = P(x_1, x_2, x_3, P_x)$ | | | | |
|---|---|---|---|---|
| $x_1$ | $x_2$ | $x_3$ | $P_x$ | $P_{x,y}$ |
| 0 | 0 | 0 | 0 | 1 |
| 0 | 0 | 0 | 1 | 0 |
| 0 | 0 | 1 | 1 | 0 |
| 0 | 0 | 1 | 0 | 1 |
| 0 | 1 | 0 | 1 | 0 |
| 0 | 1 | 0 | 0 | 1 |
| 0 | 1 | 1 | 0 | 0 |
| 0 | 1 | 1 | 1 | 1 |
| 1 | 0 | 0 | 1 | 0 |
| 1 | 0 | 0 | 0 | 1 |
| 1 | 0 | 1 | 0 | 1 |
| 1 | 0 | 1 | 1 | 0 |
| 1 | 1 | 0 | 0 | 0 |
| 1 | 1 | 0 | 1 | 1 |
| 1 | 1 | 1 | 1 | 1 |
| 1 | 1 | 1 | 0 | 0 |

If $x_1$, $x_2$, $x_3$, $P_x$ is a codeword of the first error code and $P_x=x_1 \oplus x_2 \oplus x_3$ applies, $P_{x,y}$ is determined, in accordance with Table 4 and Table 3, as $$P_{x,y} = y_1(x_1, x_2, x_3) \oplus y_2(x_1, x_2, x_3) \oplus y_3(x_1, x_2, x_3)$$

and $y_1(x_1, x_2, x_3)$, $y_2(x_1, x_2, x_3)$, $y_3(x_1, x_2, x_3)$, $P_{x,y}$ form a codeword of the second error code.

If $x_1$, $x_2$, $x_3$, $P_x$ is a non-codeword of the first error code and $P_x \neq x_1 \oplus x_2 \oplus x_3$ applies, $P_{x,y}$ is determined, in accordance with Table 4 and Table 3, as $$P_{x,y} = 1 \oplus y_1(x_1, x_2, x_3) \oplus y_2(x_1, x_2, x_3) \oplus y_3(x_1, x_2, x_3)$$

and $y_1(x_1, x_2, x_3)$, $y_2(x_1, x_2, x_3)$, $y_3(x_1, x_2, x_3)$, $P_{x,y}$ do not form a codeword of the second error code.

FIG. 4A illustrates how, in one exemplary embodiment, a first partial circuit 41, which implements the function $f(x_1, x_2, x_3)$ in accordance with Table 3, is supplemented by a second partial circuit 42, which implements the function $P_{x,y}(x_1, x_2, x_3, P_x)$ in accordance with Table 4. It is not necessary to modify the first partial circuit 41. One option, in some exemplary embodiments, is to implement the first partial circuit 41 and the second partial circuit 42 at least partially together, wherein at least one gate is used jointly by the partial circuit 41 and by the partial circuit 42.

$y_1$, $y_2$, $y_3$ and $P_{x,y}$ then, if no error is present and $x_1$, $x_2$, $x_3$, $P_x$ is a codeword of the first error code, form a codeword of the second error code and $y_1$, $y_2$, $y_3$ and $P_{x,y}$ then, if no error is present and $x_1$, $x_2$, $x_3$, Px is a non-codeword of the first error code, form a non-codeword of the second error code.

If $x_1$, $x_2$, $x_3$, $P_x$ is a codeword of the first error code, it is possible to detect an error in the partial circuit 41 or in the partial circuit 42 if $y_1$, $y_2$, $y_3$, $P_{x,y}$ is a non-codeword of the second error code.

Figure 4B:
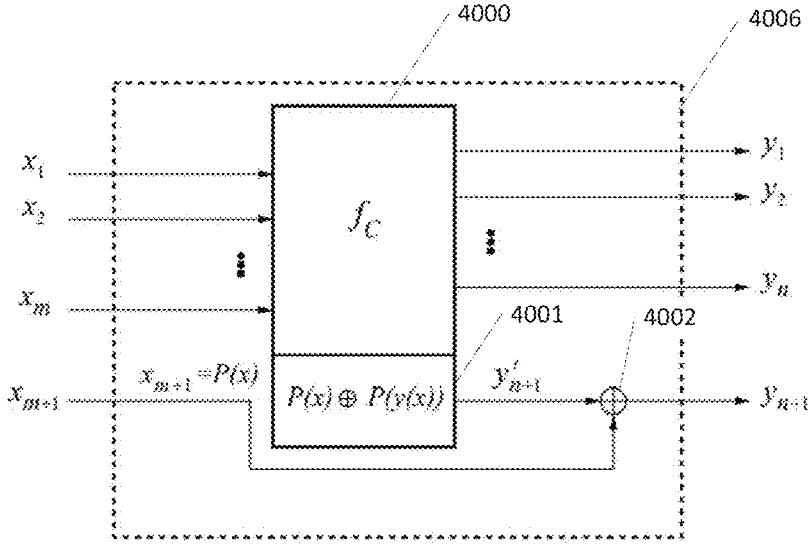
Figure 4C:
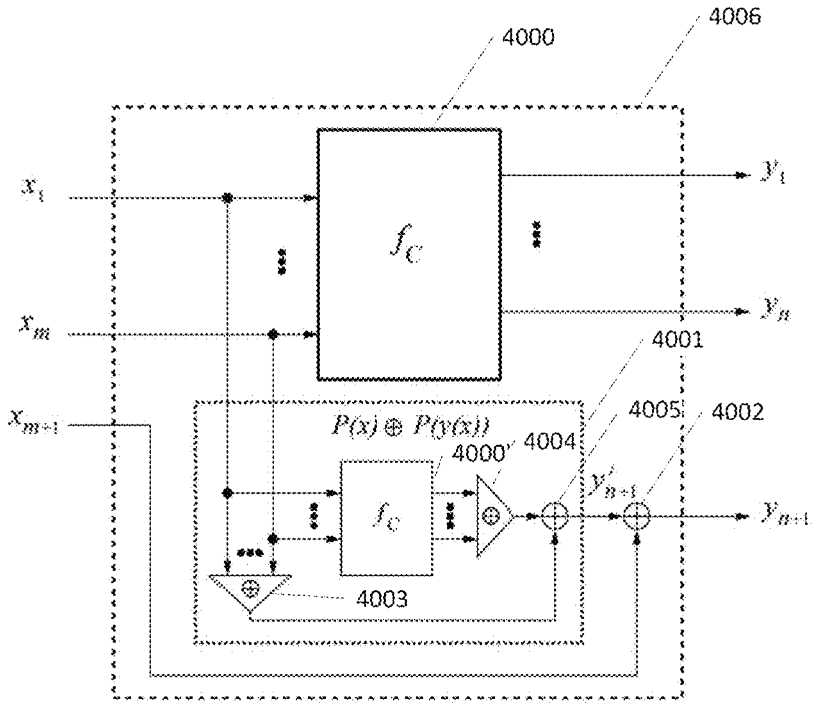

FIG. 4B shows a further exemplary embodiment of such a code-preserving combinatorial circuit 4006, and FIG. 4C shows a more precise possible implementation of FIG. 4B. A block 4000 represents the actual function of the combinatorial circuit (similar to the partial circuit 41), in which input bits $x_1$ to $x_m$ are mapped to output bits $y_1$ to $y_n$, for example in accordance with the above tables, in which m=n=3.

A block 4001 forms the bit $y'_{n+1}=x_1 \oplus x_2 \oplus \ldots \oplus x_m \oplus y_1(x) \oplus y_2(x) \oplus \ldots \oplus y_n(x)=P(x) \oplus P(y(x))$ on the basis of the input values $x_1, \ldots, x_m$. In an error-free case, the bits $x_1, \ldots, x_m$ present at the inputs of the block 4000 form, with the bit $x_{m+1}$, a codeword of the first error code. $x_{m+1}$ is determined such that: $x_{m+1}=x_1 \oplus \ldots \oplus x_m$. The bit $y'_{n+1}$ is logically combined with the parity bit $x_{m+1}$, present at the input, of the input values $x_1, \ldots, x_m$ in the exclusive OR gate 4002 to form $y_{n+1}$, such that $$y_{n+1} = P(x) \oplus P(y(x)) \oplus x_{m+1} = P(x) \oplus P(y(x)) \oplus P(x) = P(y(x))$$

applies. In an error-free case, $y_{n+1}$ is thus equal to the parity $P(y(x))=y_1(x) \oplus \ldots \oplus y_n(x)$ of the outputs of the block 4000.

If $x_1, \ldots, x_m, x_{m+1}$ erroneously do not form a codeword of the first error code and if $P(x)=x_1 \oplus \ldots \oplus x_m \neq x_{m+1}$ erroneously applies, then $y_{n+1} \neq P(y(x))$, and a non-codeword of the second error code is output on the output lines of the block 4006. $y_{n+1} \neq P(y(x))=y_1(x) \oplus \ldots \oplus y_{n+1}(x)$ then applies.

FIG. 4C explains one example of an implementation of the block 4001 in more detail. In an exclusive OR gate 4003, the input bits $x_1, \ldots, x_m$ are logically combined to form $P(x)=x_1 \oplus \ldots \oplus x_m$ and the result is supplied to the exclusive OR gate 4005. In an error-free case, this result at the output of the gate 4003 is equal to the parity bit $x_{m+1}$ of the input values $x_1, \ldots, x_m$.

In addition, a copy 4000' of the block 4000 replicates the output bits $y_1(x), \ldots, y_n(x)$ of the block 4000, which are subjected to an exclusive OR logic combination by an exclusive OR gate 4004 in order to form a parity bit $y_1(x) \oplus \ldots \oplus y_n(x)$ of these bits. The output of the exclusive OR gate 4004 is supplied to the exclusive OR gate 4005 and combined logically with the output of the exclusive OR gate 4003 to form $y'_{n+1}$. In FIG. 4C, the block 4001 may be optimized by a person skilled in the art with a synthesis tool. In the exemplary embodiment illustrated in FIG. 4C, the block 4001 is formed independently of the block 4000. One option is to use outputs of the block 4000 at least partially also as outputs of the block 4000', so that circuit parts of the block 4001 are able to be used jointly.

Figure 5A:
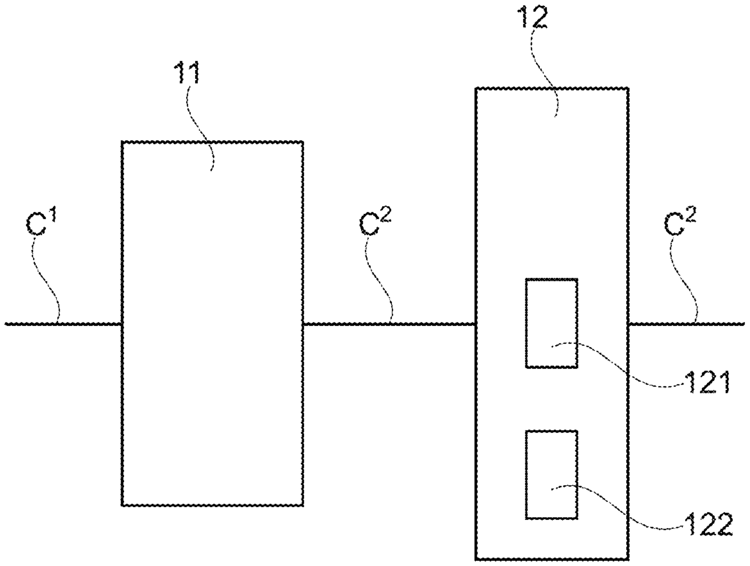
FIGS. 5A to 5C show devices according to some embodiments.
Figure 5B:
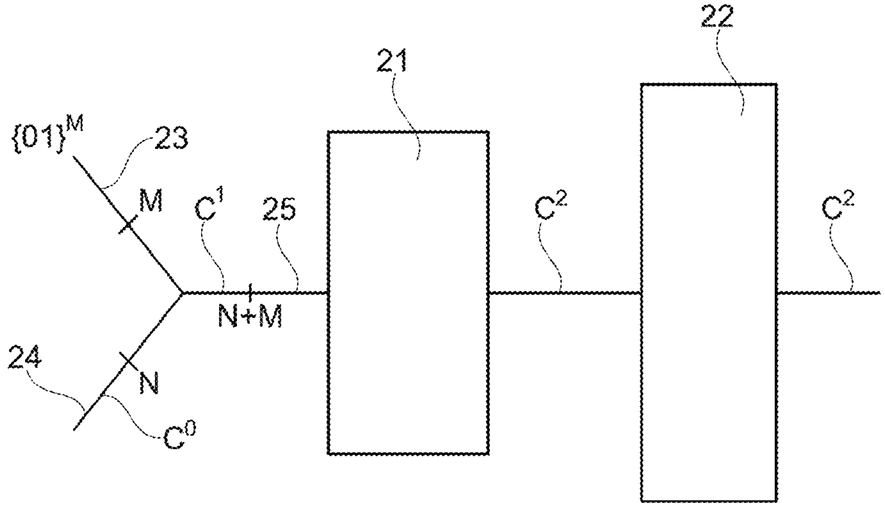

Next, the various variants of FIG. 3 for inputs of the combinatorial circuit (no additional input, input 3000 for one or more bits not protected by an error code, input 3001 for one or more bits protected by an error code) are explained again in more detail with reference to FIGS. 5A and 5B with reference to examples. FIG. 5A corresponds here to the variant of the circuit 1011A in FIG. 3 and also corresponds essentially to the configuration illustrated in FIG. 1.

FIG. 5A shows a circuit arrangement in which an arrangement 12 of memory elements for error-tolerant storage of bits and error correction of at least one bit error is connected downstream of a combinatorial circuit 11.

First of all, consideration is given to a case where no error is present. A codeword of a first error code $C^1$ is present at the input of the combinatorial circuit 11, said codeword being provided on input lines protected by the first error code. The combinatorial circuit 11 outputs a codeword of a second error code $C^2$, which is written to and stored in the arrangement 12 of memory elements for error-tolerant storage of bits and for correction of at least one one-bit error and is read out as the same codeword of the second error code $C^2$ at a later time.

FIG. 5A shows two memory elements 121 and 122 as part of the arrangement 12. The arrangement 12 may also comprise a different number of memory elements. Flip-flops, latches, or other memory elements may for example serve as memory elements.

The behavior of the circuit arrangement of FIG. 5A in the event of the occurrence of various errors will now be explained below. First of all, a description is given of the case where a non-codeword of the error code $C^1$ is present on the input line of the combinatorial circuit 11, this having arisen for example from the codeword of the error code $C^1$ due to an erroneous bit on the input line. The occurrence of a non-codeword of the first error code may indicate that an error has occurred on the line.

The combinatorial circuit 11 is designed such that it maps a codeword of the first error code to a codeword of the second error code and maps a non-codeword of the first error code to a non-codeword of the second error code. The non-codeword present at its input is mapped to a non-codeword of the error code $C^2$ by the combinatorial circuit 11 and stored in the arrangement 12 and read out, at a later time, as a non-codeword of the second error code $C^2$. The error is detected if the corresponding non-codeword is checked by an error detection circuit, such as the error detection circuit 1000. This may take place immediately after the output from the combinatorial circuit 11, or else after the output from the arrangement 12.

Consideration is now given to the case where an error is present within the combinatorial circuit 11. If this leads, when a codeword of the first error code $C^1$ is input, to a non-codeword of the second error code $C^2$ being output by the faulty combinatorial circuit 11 and stored in the arrangement 12 and being read out at a later time, the internal error in the combinatorial circuit is able to be detected. The error is detected if the corresponding non-codeword is checked by an error detection circuit. This may take place immediately after the output from the combinatorial circuit 11, or else after the output from the arrangement 12. This error is not corrected in the arrangement 12.

We will now consider the case where a 1-bit error has occurred in one of the memory elements of the arrangement 12. The arrangement 12 is designed such that it corrects a 1-bit error in one of its memory elements and such an error is not noticeable at its output. If a codeword of the second error code is written to the arrangement 12, then it outputs the codeword of the second error code written thereto in unchanged form when it is read out. This is the case regardless of whether or not a 1-bit error has occurred in one of its memory elements.

The following likewise applies: If a non-codeword of the second error code is written to the arrangement 12, then it outputs the non-codeword of the second error code written thereto in unchanged form when it is read out. This is the case regardless of whether or not a 1-bit error has occurred in one of its memory elements.

If errors occur more frequently in memory elements than in combinatorial circuits or on connection lines, then it may be advantageous, as in the exemplary embodiments discussed here, to combine the combinatorial circuit 11 with the arrangement 12 of memory elements for error-tolerant storage of bits and error correction of at least one bit error. By way of example, in some exemplary embodiments, this may have the advantage that a relatively frequent occurrence of errors in memory elements cannot lead to frequent indication of an error and interruption of operation, since an error in the memory elements is corrected and not just detected.

FIG. 5B shows a further embodiment of a combinatorial circuit 21, in accordance with the combinatorial circuit 1011B of FIG. 3. The combinatorial circuit 21 is designed such that, as in FIG. 5A, it maps a codeword of the first error code to a codeword of the second error code and maps a non-codeword of the first error code to a non-codeword of the second error code.

A codeword of a 0th error code $C^0$ is provided on the input lines 24 of word width N, and an M-tuple of M bits is provided on the input lines 23, these being present together at the N+M-bit-wide input of the combinatorial circuit 21 and forming a codeword of the error code $C^1$. No check bit of an error code is determined on the input lines 23. The input values provided on these input lines of the combinatorial circuit 21 are not protected by a specific error code. One or more check bits of the error code $C^1$ are, on their own, the check bits of the codewords of the error code $C^0$. In this exemplary embodiment, each of the check bits of the error code $C^1$ does not depend on the bits present on the input lines 23 at the input of the combinatorial circuit 21.

Codewords of the error code $C^2$ are output at the output of the combinatorial circuit 21, and the non-coded bits on the input lines 23 contribute to forming the codewords of the error code $C^2$ at the output of the combinatorial circuit 21. A check bit of a codeword of the error code $C^2$ may then depend on a bit provided on one of the input lines 23 of the combinatorial circuit 21. The non-coded data, which are present on the input lines 23, are thus incorporated into the error detection following the determination of a codeword of the error code $C^2$.

In the illustrated exemplary embodiment, an N-bit-wide input line, which carries a codeword of the 0th error code $C^0$ in the error-free case and which is protected from errors on this N-bit-wide line by the error code $C^0$, is combined with an M-bit-wide input line. In this exemplary embodiment, the M-bit-wide input line is not protected against errors on the line by an error code. In this exemplary embodiment, all values present at the inputs of the combinatorial circuit 21 determine the values output at the outputs of the combinatorial circuit, including the corresponding check bits. In an error-free case, the partial circuit 21 outputs a codeword of the second error code.

Figure 5C:
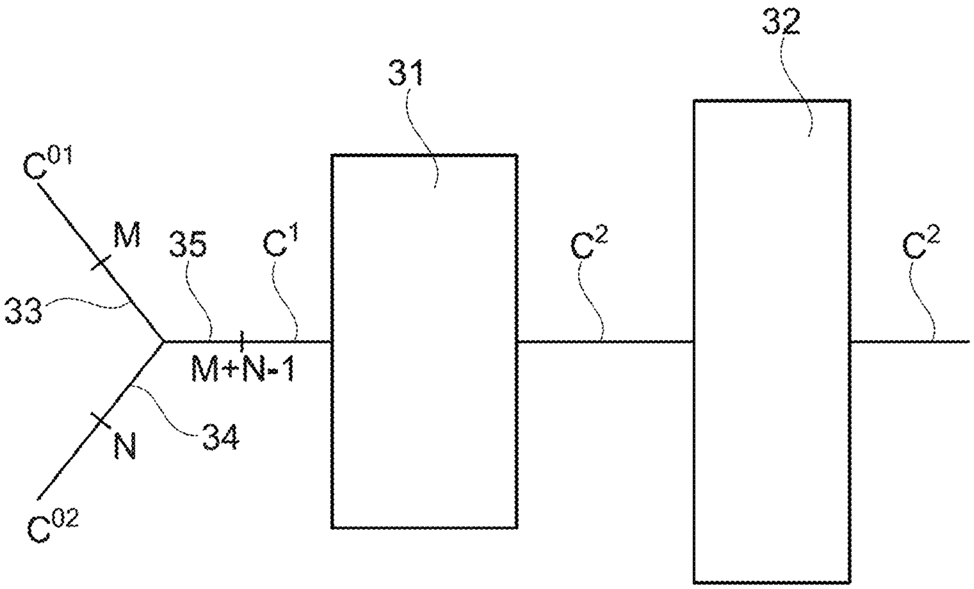

FIG. 5C shows a further exemplary embodiment of a combinatorial circuit 31, which corresponds, at the input side, to the combinatorial circuit 1011C of FIG. 3. The combinatorial circuit 31 is designed such that, as in FIG. 5A, it maps a codeword of the first error code to a codeword of the second error code and maps a non-codeword of the first error code to a non-codeword of the second error code.

A codeword of a 02nd error code $C^{02}$ is provided on the input lines 34 of word width N, and a codeword of a 01st error code $C^{01}$ consisting of M bits is provided on the input lines 33. These may, as explained above, be referred to as partial error codes of the input of the combinatorial circuit 31.

By way of example, the error code $C^{02}$ is a parity code of length N with one parity bit, and the error code $C^{01}$ is a parity code of length M with one parity bit. FIG. 3 illustrates the case where the parity bits of the parity codes $C^{02}$ and $C^{01}$ are logically combined reversibly and unambiguously to form a common parity bit, for example by an exclusive OR logic combination. M+N−1-bit-wide input lines are then present at the input of the combinatorial circuit and carry the data bits of the input lines 33 and 34 and the exclusive OR logic combination of the parity bits of the codewords of the two parity codes $C^{02}$ and $C^{01}$.

The first error code is then determined, in this exemplary embodiment, such that, for the data bits of two input lines, a check bit is determined as a combination of the check bits of the two error codes of the two input lines.

Figure 6:
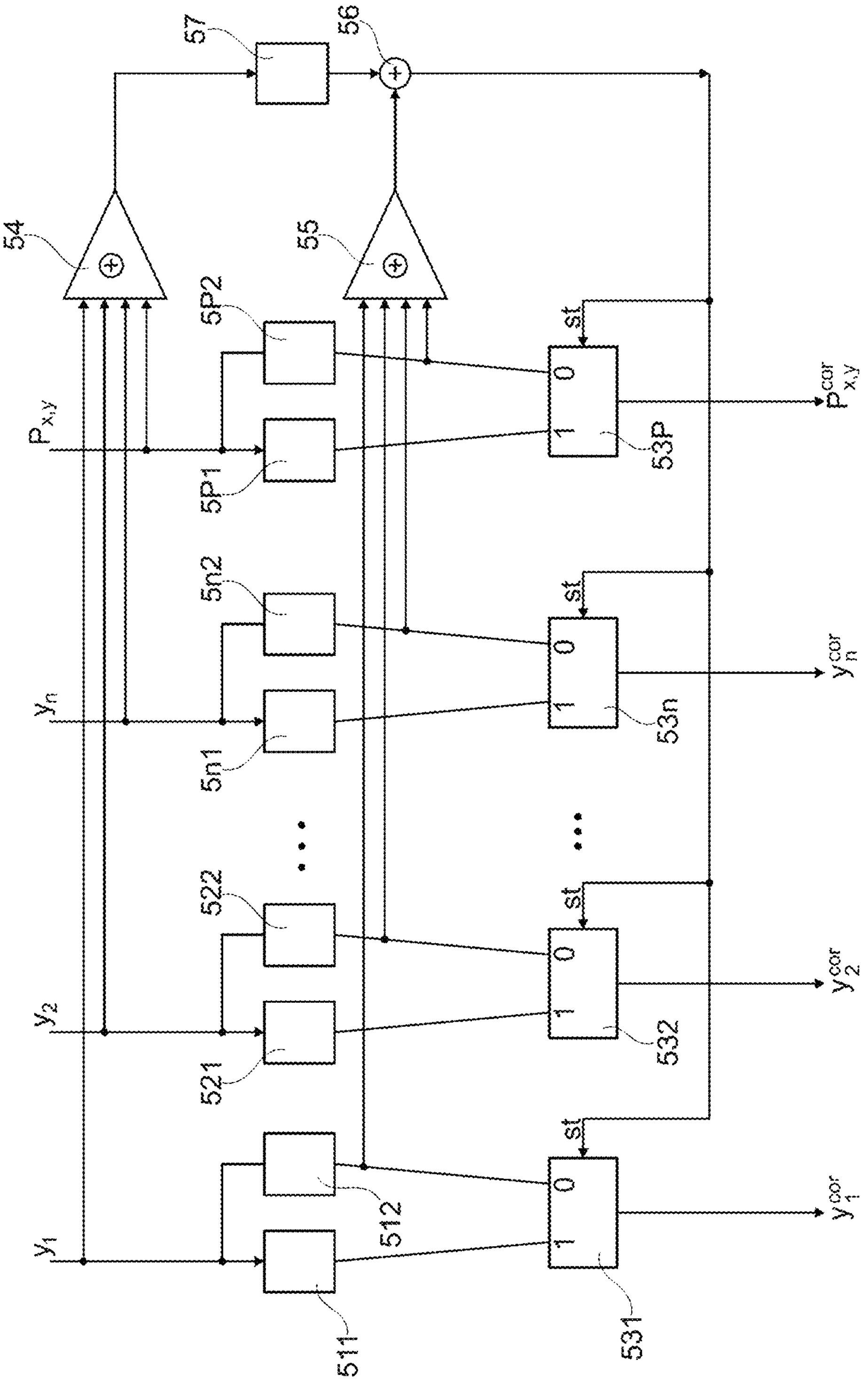
FIGS. 6, 7 and 8 show circuit arrangements with error correction that are able to be used in devices.
Figure 7:
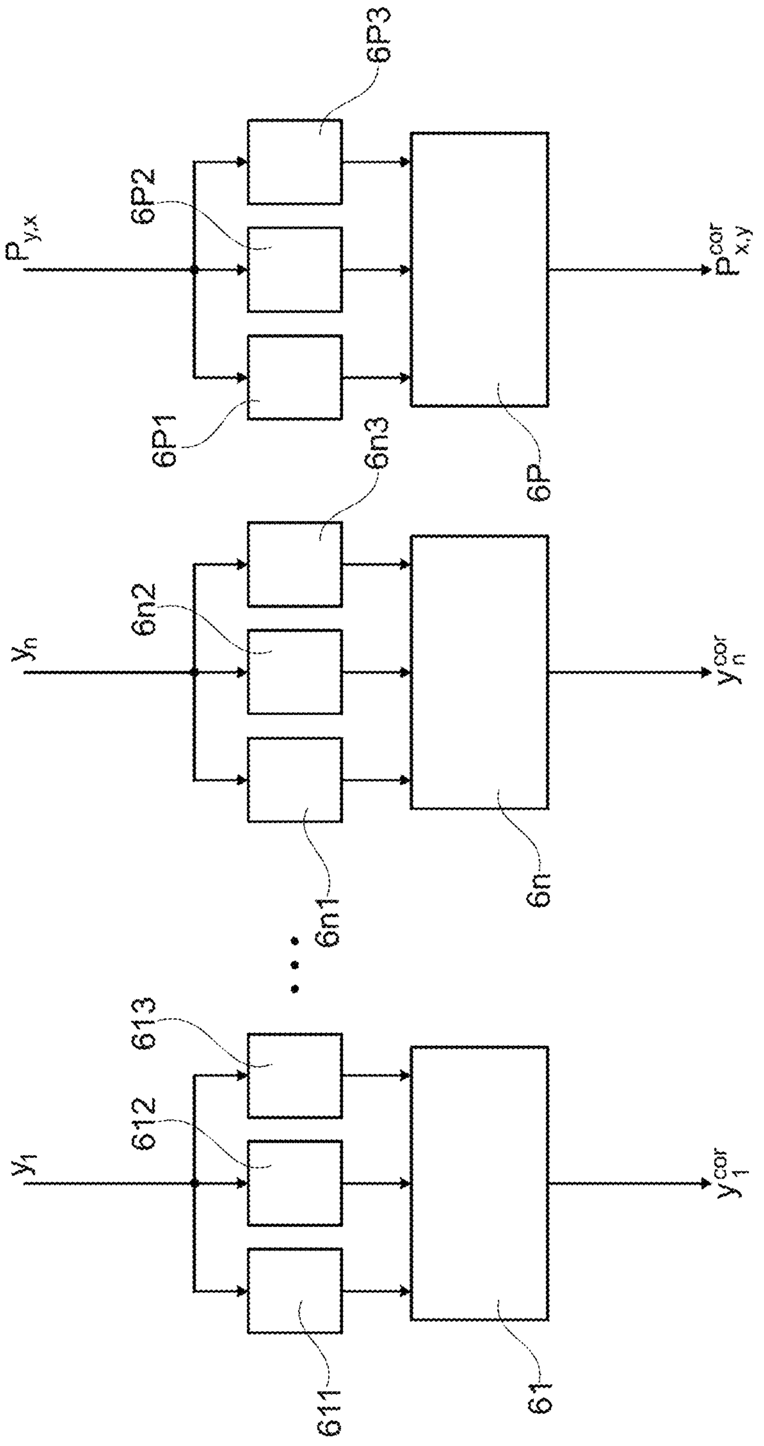
Figure 8:
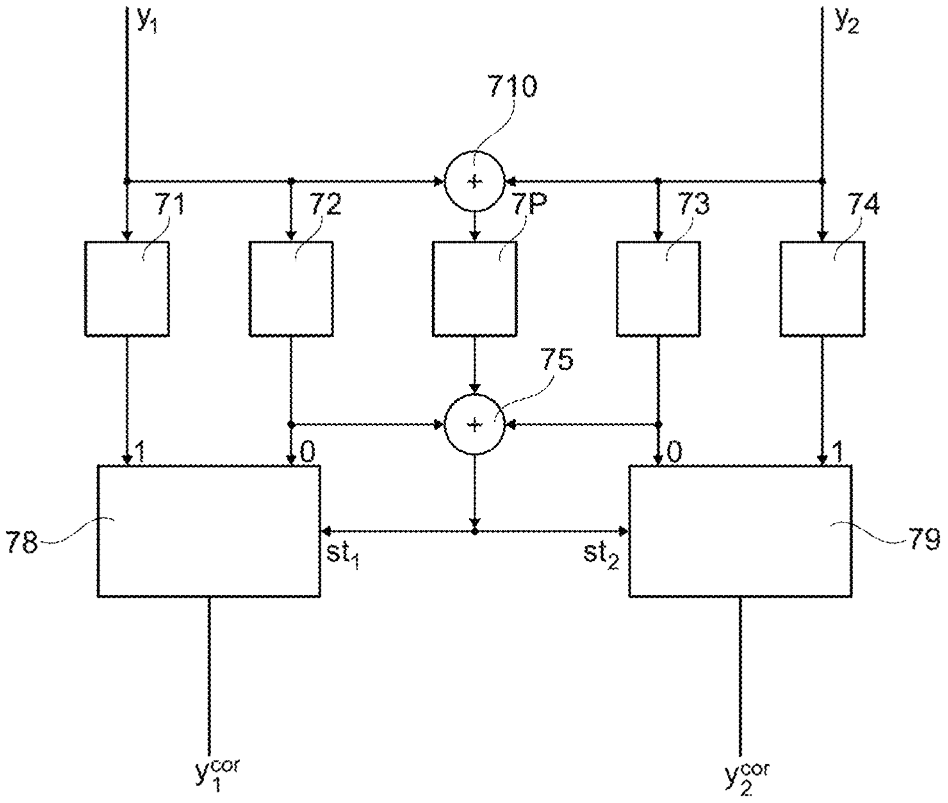

Finally, now with reference to FIGS. 6 to 8, an explanation is given of various implementation options for memory arrangements that correct errors.

FIG. 6 shows one exemplary embodiment of an arrangement of memory elements for error-tolerant storage of bits that are output by a combinatorial circuit, which arrangement, in the error-free case, transforms a codeword of a first error code into a codeword of a second error code and transforms a non-codeword of the first error code into a non-codeword of the second error code. The arrangement of memory elements of FIG. 6 has n+1 inputs for inputting the bits $y_1, y_2, \ldots, y_n$ and $P_{x,y}$. In FIG. 6, here, n>2. The inputs of the circuit arrangement of FIG. 6 are each connected to inputs of two memory elements and connected to a further memory element 57 via an exclusive OR logic combination 54. The exclusive OR logic combination may also be referred to as an exclusive OR circuit. The arrangement of memory elements in FIG. 6 may be used as a memory circuit or arrangement of memory elements in each of the above exemplary embodiments.

In the example illustrated in FIG. 6, the input values $y_1, y_2, \ldots, y_n, P_{x,y}$ present at the inputs of the arrangement of memory elements of FIG. 6 form a codeword of the second error code if no error is present and the input values input into the upstream combinatorial circuit form a codeword of the first error code.

The input values $y_1, y_2, \ldots, y_n, P_{x,y}$ present at the inputs of the arrangement of memory elements of FIG. 6 form a non-codeword of the second error code if no error is present in the combinatorial circuit and the input values input into the upstream combinatorial circuit form a non-codeword of the first error code. By way of example, the input values $y_1, y_2, \ldots, y_n, P_{x,y}$ form a non-codeword if an error is present on the input lines of the upstream combinatorial circuit, such that it is possible to detect an error on these input lines at the outputs of the combinatorial circuit and also at the outputs of the arrangement of error-tolerant memory elements or, in the case of a sequence or a series connection of a number of corresponding combinatorial circuits and arrangements of memory elements, is able to be detected at outputs of any downstream combinatorial circuit or an arrangement of memory elements.

The input carrying the bit $y_1$ is connected simultaneously to the data inputs of the memory elements 511 and 512 and to the data input of the memory element 57 via the exclusive OR logic combination 54. The outputs of the memory elements 511 and 512 are connected to a first and second input of a demultiplexer 531, the output of which carries the corrected output signal $y_1^{cor}$ and at the control input of which the control signal st output by an exclusive OR gate 56 is present.

The input carrying the bit $y_2$ is connected simultaneously to the data inputs of the memory elements 521 and 522 and to the data input of the memory element 57 via the exclusive OR logic combination 54. The outputs of the memory elements 521 and 522 are connected to a first and second input of a demultiplexer 532, the output of which carries the corrected output signal $y_2^{cor}$ and at the control input of which the control signal st output by the exclusive OR gate 56 is present, etc. up to the input carrying the bit $y_n$, which is connected simultaneously to the data inputs of the memory elements 5*n*1 and 5*n*2 and to the data input of the memory element 57 via the exclusive OR logic combination 54. The outputs of the memory elements 5*n*1 and 5*n*2 are connected to a first and second input of a demultiplexer 53*n*, the output of which carries the corrected output signal $y_n^{cor}$ and at the control input of which the control signal st output by the exclusive OR gate 56 is present.

In addition, the following applies in the exemplary implementation of FIG. 6:

The input carrying the bit $P_{x,y}$ is connected simultaneously to the data inputs of the memory elements 5P1 and 5P2 and to the data input of the memory element 57 via the exclusive OR logic combination 54. The outputs of the memory elements 5P1 and 5P2 are connected to a first and second input of a demultiplexer 53*p*, the output of which carries the corrected output signal $P_{x,y}^{cor}$ and at the control input of which the control signal st output by the exclusive OR gate 56 is present.

The arrangement of memory elements is designed such that a 1-bit error in one of its memory elements does not result in an erroneous output.

If for example the value output by the memory element 521 is erroneous and all other values output by the memory elements are correct, then the control value output by the exclusive OR gate is st=0 and the demultiplexers 531 to 53P connect their respective 0 input to their output, so that the erroneous value output by the memory element 521 is not passed on to the output of the demultiplexer 532 and $y_2^{cor}$ outputs the correct value output by the memory element 522.

If, on the other hand, the value output by the memory element 522 is erroneous and all other values output by the memory elements are correct, then the control value output by the exclusive OR gate is st=1 and the demultiplexers 531 to 53P connect their respective 1 input to their output, so that the erroneous value output by the memory element 522 is not passed on to the output of the demultiplexer 532 and $y_2^{cor}$ outputs the correct value output by the memory element 521.

FIG. 7 illustrates an arrangement of memory elements according to a further implementation that may be used in the above exemplary embodiments, the inputs of which, as in FIG. 6, carry the values $y_1, \ldots, y_n, P_{x,y}$, wherein each input is connected to in each case three memory elements 611, 612, 613, . . . , 6*n*1, 6*n*2, 6*n*3, 6P1, 6P2, 6P3. A respective majority decision-maker 61, . . . , 6*n*, 6P having three inputs and one output is connected downstream of each group of three memory elements. An error in one of the memory elements 611, . . . , **6*n*3, 6P1, 6P2, 6P3 does not have any erroneous effect at the outputs of the majority decision-makers 61, . . . , 6*n*, 6P**, and so each individual error in one of the memory elements is corrected.

FIG. 8 shows a circuit of memory elements with two inputs and two outputs, which may also be used to implement an arrangement of memory elements with more than two inputs, as described in DE 10 2012 102 080 A1.

The inputs of this circuit carry the two values $y_1$ and $y_2$ and output the corrected values $$y_1^{cor} \text{ and } y_2^{cor}$$

at their two outputs.

The input carrying the value $y_1$ is connected to the input of the memory element 71, to the input of the memory element 72 and to a first input of an exclusive OR element 710 having two inputs and one output. The input carrying the value $y_2$ is connected to the input of the memory element 73, to the input of the memory element 74 and to the second input of the exclusive OR element 710. The output of the exclusive OR element 710 is fed into the input of a memory element 7P, the output of which is connected to a first input of an exclusive OR circuit 75 having three inputs and one output.

The output of the memory element 71 is connected to the 1 input of a demultiplexer 78 having two inputs and one output, while the output of the memory element 72 is connected to the 0 input of the demultiplexer 78 and to the second input of the exclusive OR circuit 75. The demultiplexer 78 outputs the value $y_1^{cor}$ at its output.

The output of the memory element 74 is connected to the 1 input of a demultiplexer 79 having two inputs and one output, while the output of the memory element 73 is connected to the 0 input of the demultiplexer 79 and to the third input of the exclusive OR circuit 75.

The demultiplexer 79 outputs the value $$y_2^{cor}$$

at its output. The output of the exclusive OR circuit 75 outputs a binary control signal that is fed to the control input of the demultiplexers 78 and 79.

If the control signal st=1, then the demultiplexers 78 and 79 connect their respective 1 inputs to their output. If the control signal st=0, then the demultiplexers connect their respective 0 input to their output. The control signal is determined by the values output by the memory elements 72, 73 and 7P. If no error occurs in any of these memory elements 72, 73, 7P, then the control signal st=0 and the values output by the memory elements 72 and 73 are output as correct values $y_1^{cor}$ and $y_2^{cor}$ at the outputs of the demultiplexers 78 and 79. Any error in the memory elements 71 and 74 does not affect the outputs $y_1^{cor}$ and $y_2^{cor}$. If an error occurs in one of the memory elements 72, 73 or 7P, then the control signal st=1 and the demultiplexers 78 and 79 each connect their 1 input to their output and any error in one of the memory elements 72, 73 and 7P does not affect the outputs $y_1^{cor}$ and $y_2^{cor}$.

If the combinatorial circuit has more than two outputs, then one option is to connect in each case two outputs, for example two successive outputs, to the two inputs of the arrangement of memory elements illustrated in FIG. 8.

As may be seen from the above implementations in FIG. 6 to 8, there are many options for implementing memory arrangements that correct at least 1-bit errors.

As described, it is possible to use error detection circuits only in a few places and for example, using an error detection circuit for the second error code, also to detect non-codewords of the first error code at the input of a combinatorial circuit, and thus also errors on the input lines, without the need for a further error detection circuit for the first error code. It may be sufficient to use only a single error detection circuit. If for example, as shown in FIG. 1, an error detection circuit for the second error code is positioned downstream of the memory elements of the arrangement of memory elements, then, even if a 1-bit error occurs in one of the memory elements, it is also possible to detect non-codewords at the input of the combinatorial circuit using just the error detection circuit for the second error code.

If for example a multi-bit error occurs in memory elements of the arrangement of memory elements and is not able to be corrected, then, in some exemplary embodiments, this multi-bit error is also able to be detected using the error detection circuit for the second error code.

A single error detection circuit for the second error code may be sufficient to detect errors on the input lines of combinatorial circuits, internal errors in the combinatorial circuits, and non-correctable errors in the memory elements of the arrangement of memory elements, even in a series circuit of combinatorial circuits and downstream arrangements of memory elements.

The design of devices and circuit arrangements as described above may be carried out fully automatically in some exemplary embodiments. Once the nominal function of the one or more combinatorial circuits (for example as defined in the tables above) has been established, the rest of the device may be derived fully automatically therefrom. By way of example, circuit parts that generate the check bits may be generated automatically, and the memories for storing all data bits and check bits and for internal memory correction and the error detection circuit may also be generated by way of corresponding conventional circuit design tools.

Some exemplary embodiments are defined by the following examples:

Example 1. A circuit arrangement, comprising:

- a combinatorial circuit having a group of inputs and a group of outputs, wherein the combinatorial circuit is configured, in the event of error-free operation of the combinatorial circuit, to map a codeword, present at the group of inputs, of a first error code to a codeword of a second error code at the group of outputs, and to map a non-codeword, present at the group of inputs, of the first error code to a non-codeword of the second error code, and
- a memory circuit that is configured to store an output of the combinatorial circuit at the group of outputs and that is furthermore configured to correct at least 1-bit errors during storage.

Example 2. The circuit arrangement according to example 1, furthermore comprising an error detection circuit that is arranged at output of the memory arrangement, wherein the error detection circuit is configured to detect an error at the input of the combinatorial circuit or at the output of the combinatorial circuit on the basis of data read out from the memory arrangement.

Example 3. The circuit arrangement according to example 1 or 2, wherein the group of inputs comprises a first subgroup of inputs and a second group of inputs, wherein the first error code refers only to the first subgroup.

Example 4. The circuit arrangement according to example 1 or 2, wherein the group of inputs comprises a first subgroup of inputs and a second subgroup of inputs, wherein the first error code comprises a first partial error code for the first subgroup and a second partial error code for the second subgroup.

Example 5. The circuit arrangement according to either of examples 3 and 4, wherein the second error code refers to all outputs of the group of outputs.

Example 6. The circuit arrangement according to one of examples 1 to 5, wherein the combinatorial circuit comprises a further group of outputs, wherein the combinatorial circuit is configured to output an output to the further group of outputs based on an input at the first group of inputs.

Example 7. A system, comprising:

a first circuit arrangement according to one of examples 1 to 6, a second circuit arrangement according to one of examples 1 to 6, wherein a group of outputs of the memory circuit of the first circuit arrangement is connected to the group of inputs of the combinatorial circuit of the second circuit arrangement.

Example 8. A device, comprising:

a combinatorial circuit that is configured to receive a first bit signal containing first data bits and at least one first check bit and to output a second bit signal containing second data bits and at least one second check bit, wherein the combinatorial circuit is configured, in the event of error-free operation, if the first data bits and the at least one first check bit are a codeword of a first error code, to determine the at least one second check bit such that the second data bits and the at least one second check bit are a codeword of a second error code and, if the first data bits and the at least one first check bit are not a codeword of the first error code, to determine the at least one second check bit such that the second data bits and the at least one second check bit are not a codeword of the second error code, an arrangement of memory cells that is configured to store the second bit signal such that at least 1-bit errors are corrected during storage.

Example 9. The device according to example 8, furthermore comprising an error detection circuit that is configured to detect an error in the first bit signal or an error in the second bit signal on the basis of an output of the arrangement of memory cells.

Example 10. The device according to example 8 or 9, wherein, if the at least one first check bit and the first data bits form a codeword of the first error code, the at least one first check bit is determined by a first predefined logic combination of the first data bits and, if the at least one second check bit and the second data bits form a codeword of the second error code, the at least one second check bit is determined by a second predefined logic combination of the second data bits.

Example 11. The device according to one of examples 8 to 10, wherein the first data bits and the at least one first check bit are a real subset of the bits of the first bit signal.

Example 12. The device according to one of examples 8 to 10, wherein the first data bits and the at least one first check bit are all bits of the first bit signal.

Example 13. The device according to one of examples 8 to 12, wherein the second data bits and the at least one second check bit are all bits of the second bit signal.

Example 14. The device according to one of examples 8 to 12, wherein the second data bits and the at least one second check bit are a real subset of the bits of the second bit signal.

Example 15. A method, comprising:

processing a first bit signal containing first data bits and at least one first check bit in order to generate a second bit signal containing second data bits and at least one second check bit, wherein, in the event of error-free processing, if the first data bits and the at least one first check bit are a codeword of a first error code, the at least one second check bit is determined such that the second data bits and the at least one second check bit are a codeword of a second error code and, if the first data bits and the at least one first check bit are not a codeword of the first error code, the at least one second check bit is determined such that the second data bits and the at least one second check bit are not a codeword of the second error code, storing the second bit signal, and correcting at least 1-bit errors during storage.

Example 16. The method according to example 15, furthermore comprising:

reading out the stored second bit signal, and detecting an error in the first bit signal or an error in the second bit signal on the basis of the read-out second bit signal.

Example 17. The device according to example 15 or 16, wherein the first data bits and the at least one first check bit are a real subset of the bits of the first bit signal.

Example 18. The device according to example 15 or 16, wherein the first data bits and the at least one first check bit are all bits of the first bit signal.

Example 19. The device according to one of examples 15 to 18, wherein the second data bits and the at least one second check bit are all bits of the second bit signal.

Example 20. The device according to one of examples 15 to 18, wherein the second data bits and the at least one second check bit are a real subset of the bits of the second bit signal.

Although specific exemplary embodiments have been illustrated and described in this description, individuals with ordinary knowledge in the art will recognize that a variety of alternative and/or equivalent implementations may be chosen as a substitute for the specific exemplary embodiments shown and described in this description without departing from the scope of the disclosed invention. The intention is for this application to cover all adaptations or variations of the specific exemplary embodiments discussed here. It is therefore intended for this invention to be limited only by the claims and the equivalents of the claims.

What is claimed is:

1. A circuit arrangement, comprising:

a combinatorial circuit having a group of inputs and a group of outputs, wherein the combinatorial circuit is configured, during error-free operation of the combinatorial circuit, to map a codeword, present at the group of inputs, of a first error code to a codeword of a second error code at the group of outputs, and to map a non-codeword, present at the group of inputs, of the first error code to a non-codeword of the second error code; and a memory circuit configured to store an output of the combinatorial circuit at the group of outputs, and configured to correct at least 1-bit errors occurring during storage.

2. The circuit arrangement as claimed in claim 1, further comprising:

an error detection circuit coupled to an output of the memory circuit, wherein the error detection circuit is configured to detect an error at the group of inputs of the combinatorial circuit or at the group of outputs of the combinatorial circuit based on read out from the memory circuit.

3. The circuit arrangement as claimed in claim 1, wherein the group of inputs comprises a first subgroup of inputs and a second group of inputs, and the first error code refers only to the first subgroup.

4. The circuit arrangement as claimed in claim 1, wherein the group of inputs comprises a first subgroup of inputs and a second subgroup of inputs, wherein the first error code comprises a first partial error code for the first subgroup and a second partial error code for the second subgroup.

5. The circuit arrangement as claimed in claim 3, wherein the second error code refers to all outputs of the group of outputs.

6. The circuit arrangement as claimed in claim 1, wherein the combinatorial circuit comprises a further group of outputs, wherein the combinatorial circuit is configured to provide an output at the further group of outputs based on an input at the group of inputs.

7. A system, comprising a plurality of circuit arrangements as claimed in claim 1, wherein a group of outputs of the memory circuit of a first circuit arrangement of the plurality of circuit arrangements is connected to the group of inputs of the combinatorial circuit of a second circuit arrangement of the plurality of circuit arrangements.

8. A device, comprising:

a combinatorial circuit configured to:

receive a first bit signal containing first data bits and at least one first check bit, and output a second bit signal containing second data bits and at least one second check bit, during error-free operation:

map a codeword of a first error code present at the first data bits and the at least one first check bit being a codeword of a first error code to a codeword of a second error code at the second data bits and at the at least one second check bit, and map a first word present at the first data bits and the at least one first check bit to a second word at the second data bits and the at least one second check bit, wherein the first word is not the codeword of the first error code, and the second word is not the codeword of the second error code; and an arrangement of memory cells configured to store the second bit signal, and configured to correct at least 1-bit errors occurring during storage.

9. The device as claimed in claim 8, further comprising an error detection circuit configured to detect an error in the first bit signal or an error in the second bit signal based on an output of the arrangement of memory cells.

10. The device as claimed in claim 8, wherein, the combinatorial circuit is further configured to:

determine the at least one first check bit by a first predefined logic combination of the first data bits in response to the at least one first check bit and the first data bits forming a codeword of the first error code; and determine the at least one second check bit by a second predefined logic combination of the second data bits in response to the at least one second check bit and the second data bits forming a codeword of the second error code.

11. The device as claimed in claim 8, wherein the first data bits and the at least one first check bit are a real subset of the bits of the first bit signal.

12. The device as claimed in claim 8, wherein the first data bits and the at least one first check bit are all bits of the first bit signal.

13. The device as claimed in claim 8, wherein the second data bits and the at least one second check bit are all bits of the second bit signal.

14. The device as claimed in claim 8, wherein the second data bits and the at least one second check bit are a real subset of the bits of the second bit signal.

15. A method, comprising:

processing a first bit signal containing first data bits and at least one first check bit in order to generate a second bit signal containing second data bits and at least one second check bit, processing comprising, during error-free processing:

mapping a codeword of a first error code present at the first data bits and the at least one first check bit being a codeword of a first error code to a codeword of a second error code at the second data bits and at the at least one second check bit, and mapping a first word present at the first data bits and the at least one first check bit to a second word at the second data bits and at the at least one second check bit, wherein the first word is not the codeword of the first error code, and the second word is not the codeword of the second error code;

storing the second bit signal in a memory; and correcting at least 1-bit errors occurring while the second bit signal is stored in the memory.

16. The method as claimed in claim 15, furthermore comprising:

reading out the stored second bit signal from the memory, and detecting an error in the first bit signal or an error in the second bit signal based on the read-out second bit signal.

17. The method as claimed in claim 15, wherein the first data bits and the at least one first check bit are a real subset of the bits of the first bit signal.

18. The method as claimed in claim 15, wherein the first data bits and the at least one first check bit are all bits of the first bit signal.

19. The method as claimed in claim 15, wherein the second data bits and the at least one second check bit are all bits of the second bit signal.

20. The method as claimed in claim 15, wherein the second data bits and the at least one second check bit are a real subset of the bits of the second bit signal.

* * * * *